US010663674B1

(12) United States Patent
Zhu et al.

(10) Patent No.: US 10,663,674 B1
(45) Date of Patent: May 26, 2020

(54) COUPLING DEVICE AND FIBER OPTIC CONNECTOR HAVING THE SAME

(71) Applicants: Amphenol Fiber Optic Technology (Shenzhen) Co., Ltd., Shenzhen, Guangdong Province (CN); Gloriole Electroptic Technology Corp., Kaohsiung (TW)

(72) Inventors: Ling-Hua Zhu, Shenzhen (CN); Xing-Fu Mo, Shenzhen (CN); Jinan Zhou, Shenzhen (CN); Shu-Hui Hsu, Kaohsiung (TW)

(73) Assignee: Amphenol Fiber Optic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/596,314

(22) Filed: Oct. 8, 2019

(30) Foreign Application Priority Data

Jun. 26, 2019 (TW) ............................. 108208181 U

(51) Int. Cl.
*G02B 6/38* (2006.01)

(52) U.S. Cl.
CPC ......... *G02B 6/3849* (2013.01); *G02B 6/3825* (2013.01); *G02B 6/3874* (2013.01); *G02B 6/3887* (2013.01)

(58) Field of Classification Search
CPC .. G02B 6/3816; G02B 6/3825; G02B 6/3849; G02B 6/3869; G02B 6/3882; G02B 6/387; G02B 6/3874; G02B 6/3887; G02B 6/3893
USPC ....................................... 385/53, 74–87, 139
See application file for complete search history.

(56) References Cited

U.S. PATENT DOCUMENTS 9,625,655 B1 * 4/2017 Zhu ...................... G02B 6/3825
10,185,098 B2 * 1/2019 Jiang .................... G02B 6/3825

* cited by examiner

*Primary Examiner* — Michael P Mooney
(74) *Attorney, Agent, or Firm* — Burris Law, PLLC

(57) ABSTRACT

A coupling device includes a socket defining a through groove and a connecting seat connected to a rear end of the socket. The connecting seat has a casing portion defining a plugging space therein, a base wall portion disposed in the casing portion and defining a through hole in spatial communication with the through groove and the plugging space, two first connecting portions respectively disposed at two lateral sides of the through hole and extending forwardly from the base wall portion to the through groove, and two second connecting portions respectively disposed at the lateral sides and extending rearwardly from the base wall portion to the plugging space. The socket and the connecting seat are formed as one piece.

9 Claims, 4 Drawing Sheets

COUPLING DEVICE AND FIBER OPTIC CONNECTOR HAVING THE SAME

CROSS-REFERENCE TO RELATED APPLICATION

This application claims priority of Taiwanese Patent Application No. 108208181, filed on Jun. 26, 2019.

FIELD

The disclosure relates to a coupling device, and more particularly to a coupling device of a fiber optic connector.

BACKGROUND

Referring to FIG. 1, an H-connector series fiber optic connector 1 has a coupling member 13 that defines a through groove 11 and a lateral opening 12 spatially communicated with the through groove 11, an end cover 14 that is removably mounted to a front end of the coupling member 13 for covering the through groove 11, a connecting member 15 that is coupled to a rear end of the coupling member 13 and that is disposed in the through groove 11, a guiding tube 16 that is inserted to the connecting member 15 and that is disposed in the through groove 11, a lateral cover 17 that is mounted to the coupling member 13 and that is for covering the lateral opening 12, a housing 19 that houses the coupling member 13 and that surrounds the fiber optic connecting terminal 18, and a sleeving member 10 that sleeves a rear end of the housing 19.

The fiber optic connector 1 is adapted for interconnecting two fiber optic connecting terminals 18 (only one is shown). Specifically, one of the fiber optic connecting terminals 18 is connected thereto by being coupled to the connecting member 15 at the rear end of the coupling member 13, and the other one is connected thereto by being inserted into the through groove 11 through the front end of the coupling member 13. However, assembling the connecting member 15, the guiding tube 16, and the lateral cover 17 to the coupling member 13 requires additional procedures which are prone to errors due to the microscopic nature of the elements involved.

SUMMARY

Therefore, an object of the present disclosure is to provide a coupling device that can alleviate the drawback of the prior art.

Another object of the present disclosure is to provide a fiber optic connector having the coupling device that can alleviate the drawback of the prior art.

According to the present disclosure, the coupling device includes a socket that defines a through groove extending in a front-rear direction, and a connecting seat that is connected to a rear end of the socket. The connecting seat has a casing portion that defines a plugging space therein, a base wall portion that is disposed in the casing portion and that defines a through hole in spatial communication with the through groove and the plugging space, two first connecting portions that are respectively disposed at two opposite lateral sides of the through hole and that extend forwardly in the front-rear direction from the base wall portion to the through groove, and two second connecting portions that are respectively disposed at the lateral sides of the through hole and that extend rearwardly in the front-rear direction from the base wall portion to the plugging space. The socket and the connecting seat are formed as one piece.

According to the present disclosure, the fiber optic connector includes the abovementioned coupling device, and a cover removably mounted to the socket of the coupling device for covering a front end of a through groove of the socket.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
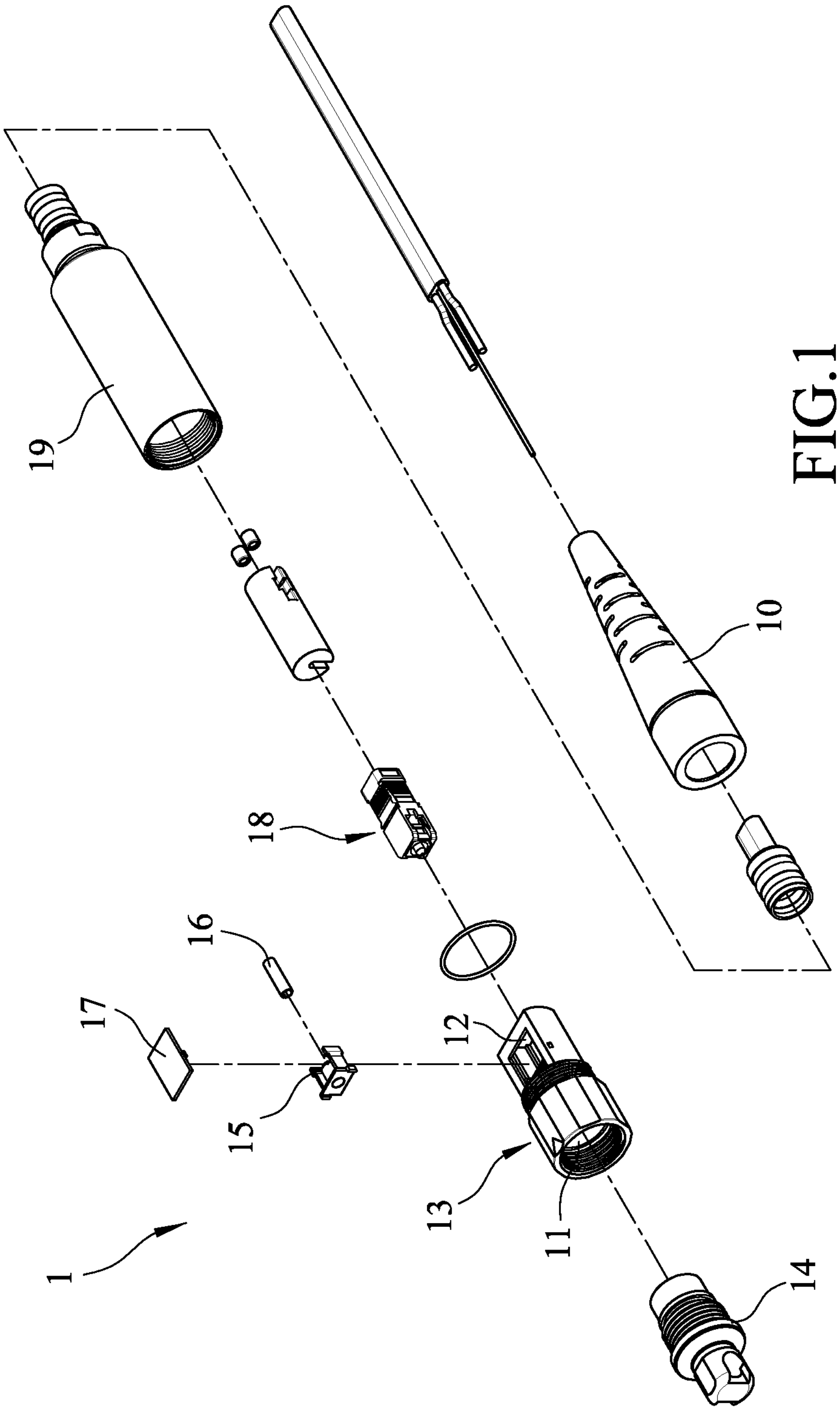
FIG. 1 is an exploded perspective view of a conventional fiber optic connector.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
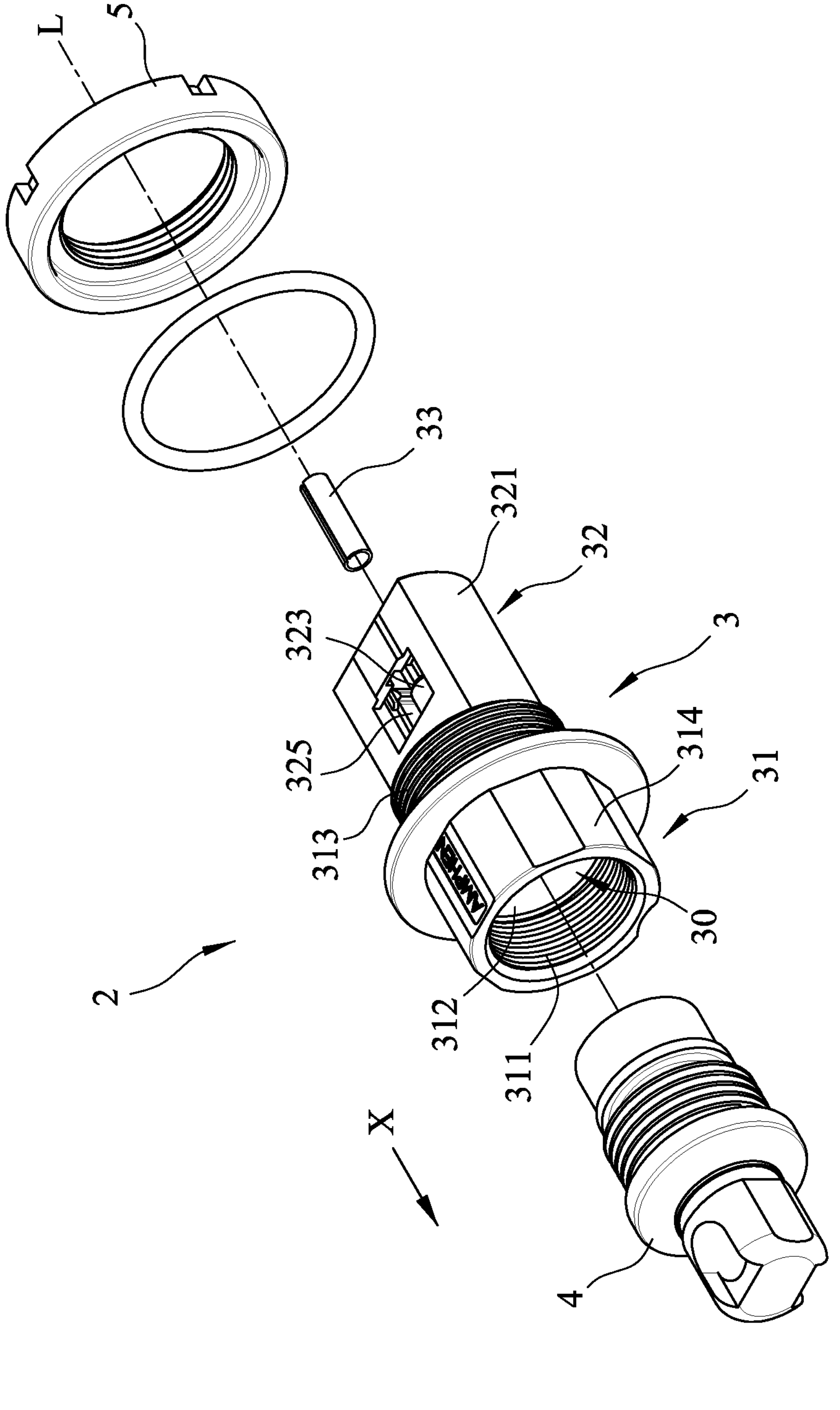
FIG. 2 is an exploded perspective view of a first embodiment of a fiber optic connector according to the disclosure.
Figure 3:
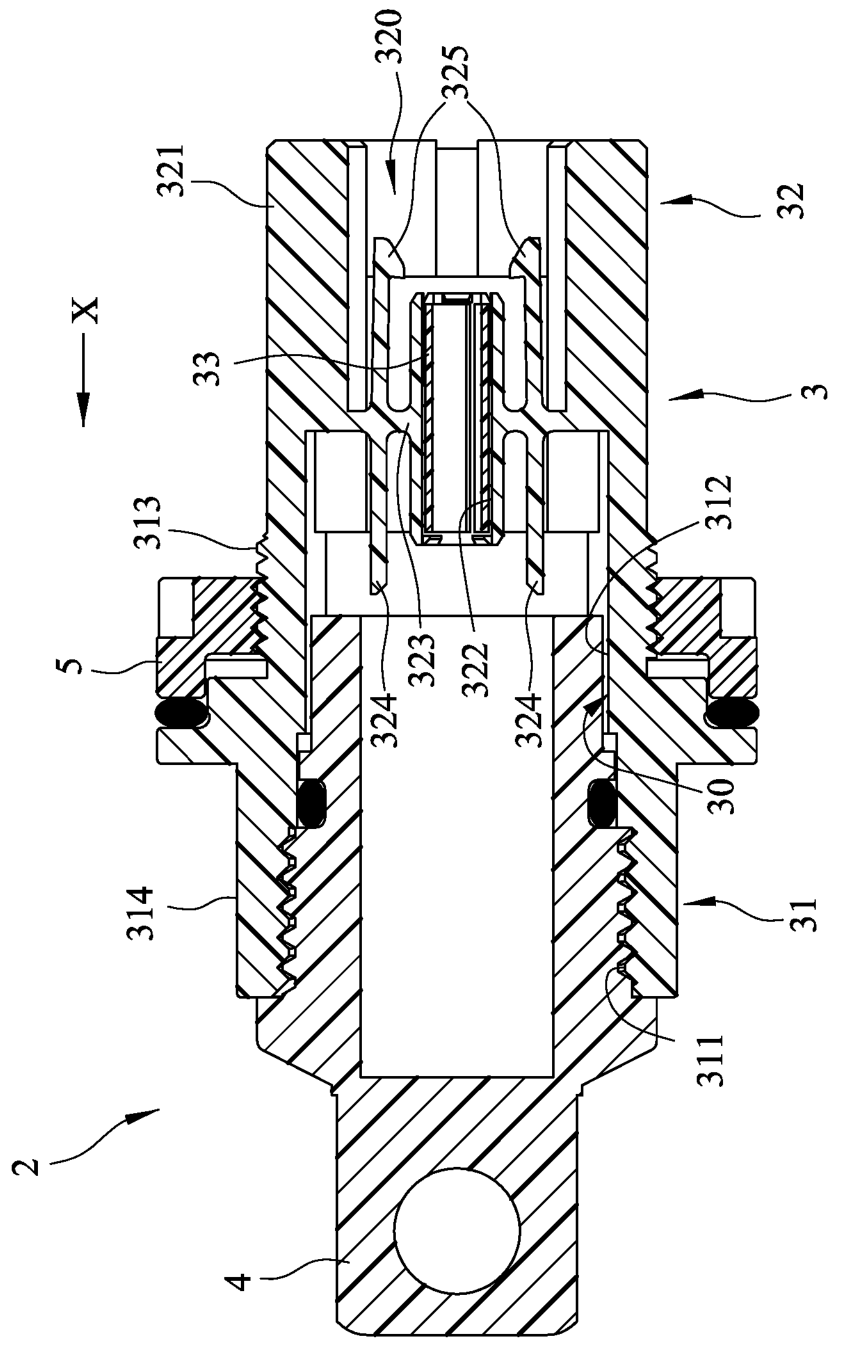
FIG. 3 is a schematic sectional view of the first embodiment.

Referring to FIGS. 2 and 3, a first embodiment of a fiber optic connector 2 according to the disclosure includes a coupling device 3, a cover 4 removably mounted to the a front end of the coupling device 3, and an annular ring 5 sleeved to a rear end of the coupling device 3. The coupling device 3 includes a socket 31 that defines a through groove 30 extending therethrough in a front-rear direction (X), a connecting seat 32 that is connected to a rear end of the socket 31, and a guiding tube 33. The socket 31 and the connecting seats 32 are formed as one piece. The socket 31 has an inner surrounding surface 312 that defines the through groove 30 and that is formed with an inner threaded portion 311, and an outer surrounding surface 314 that is opposite to the inner surrounding surface 312 and that is formed with an outer threaded portion 313. In the first embodiment, the inner threaded portion 311 is disposed in proximity to a front end of the socket 31, and the outer threaded portion 313 is disposed in proximity to a rear end of the socket 31.

The connecting seat 32 has a casing portion 321 defining a plugging space 320 therein, a base wall portion 323 disposed in the casing portion 321 and defining a through hole 322 which is in spatial communication with the through groove 30 and the plugging space 320, two first connecting portions 324 respectively disposed at two opposite lateral sides of the through hole 322 and extending forwardly in the front-rear direction (X) from the base wall portion 323 to the through groove 30, and two second connecting portions 325 respectively disposed at the lateral sides of the through hole 322 and extending rearwardly in the front-rear direction (X) from the base wall portion 323 to the plugging space 320. The first and second connecting portions 324, 325 may be either latch structures or joint structures depending on a user's need. The guiding tube 33 is inserted into the through hole 322 and has two opposite ends respectively extending into the through groove 30 and the plugging space 320 to be spatially communicated therewith. A rear end of the cover 4 is permitted to be partly threaded to the inner threaded portion 311 of the socket 31 for covering a front end of the through groove 30 of the socket 31. The annular ring 5 is threadedly mounted to the outer threaded portion 313 of the socket 31.

The second connecting portions 325 of the first embodiment is operable to be connected directly to a fiber optic connecting terminal (not shown in FIG. 2 or 3) for a optical fiber (not shown) thereof to extend into the guiding tube 33. When the cover 4 is removed, another fiber optic connecting terminal (not shown) may be inserted into the through groove 30 for the optical fiber thereof to extend into the guiding tube 33. As the socket 31 and the connecting seat 32 of the first embodiment are formed as one piece, no additional assembling elements or procedures are required.

Figure 4:
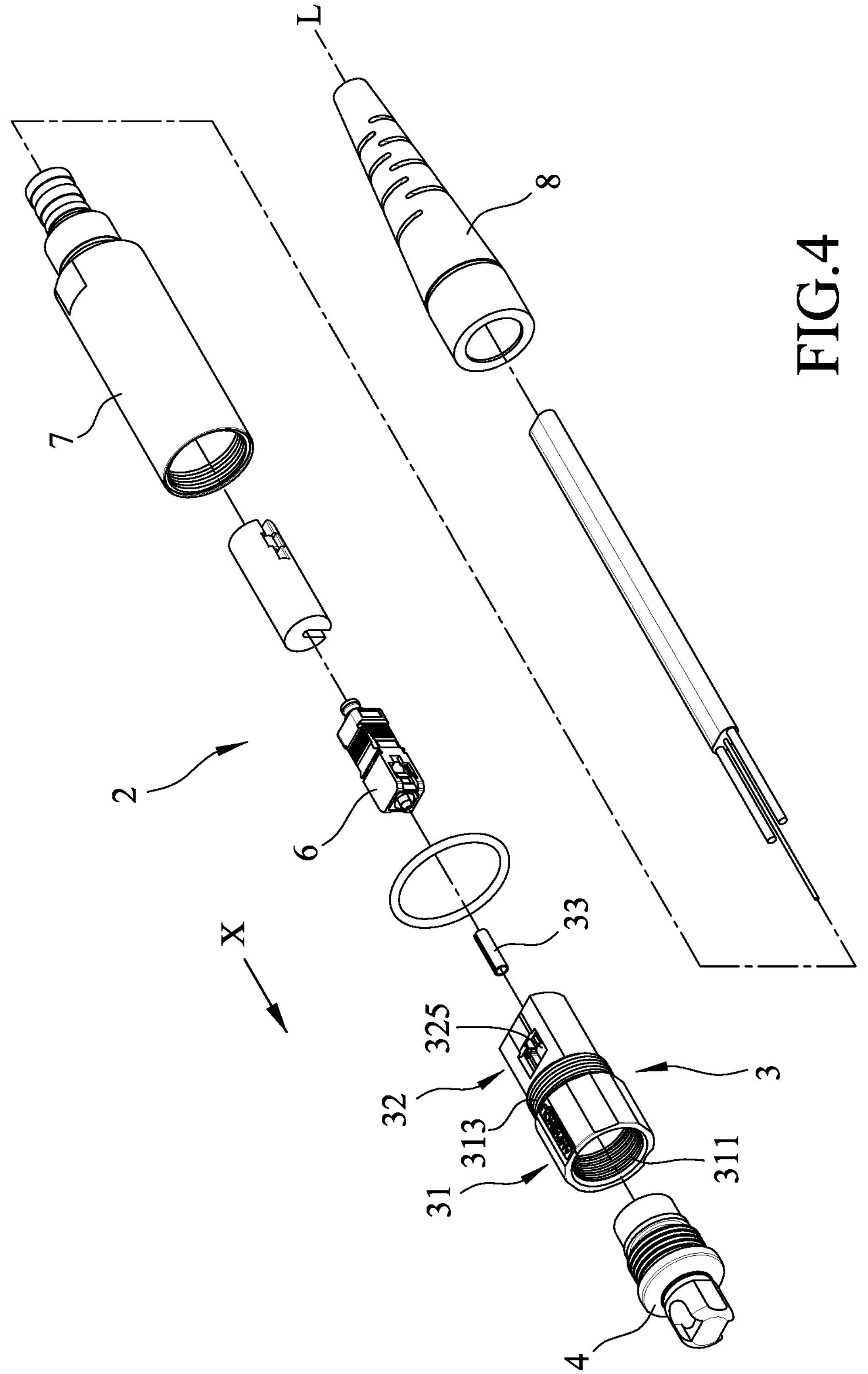
FIG. 4 is an exploded perspective view of a second embodiment of the fiber optic connector according to the disclosure.

Referring to FIG. 4, a second embodiment of the fiber optic connector 2 according the disclosure is similar to that of the first embodiment. Specifically, the annular ring 5 (see FIGS. 2 and 3) of the fiber optic connector 2 is replaced by a fiber optic connecting terminal 6 removably connected to the second connecting portions 325 of the coupling device 3, a housing 7 threadedly mounted to the outer threaded portion 313 of the socket 31, and a sleeving member 8 connected to a rear end of the housing 7. The second embodiment has the socket 31 and the connecting seat 32 that are formed as one piece, thereby having the same benefit as the first embodiment.

Overall, as the socket 31 and the connecting seat 32 of the coupling device 3 is formed as one piece, no additional assembling elements or procedures are required.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A coupling device comprising:

a socket that defines a through groove extending in a front-rear direction (X); and a connecting seat that is connected to a rear end of said socket, and that has a casing portion defining a plugging space therein, a base wall portion disposed in said casing portion and defining a through hole which is in spatial communication with said through groove and said plugging space, two first connecting portions respectively disposed at two opposite lateral sides of said through hole and extending forwardly in the front-rear direction (X) from said base wall portion to said through groove, and two second connecting portions respectively disposed at the lateral sides of said through hole and extending rearwardly in the front-rear direction (X) from said base wall portion to said plugging space;

wherein, said socket and said connecting seat are formed as one piece.

2. The coupling device as claimed in claim 1, further comprising a guiding tube that is inserted into said through hole, and that has two opposite ends respectively extending into said through groove and said plugging space.

3. The coupling device as claimed in claim 1, wherein said socket has an inner surrounding surface that defines said through groove and that is formed with an inner threaded portion, and an outer surrounding surface that is opposite to said inner surrounding surface and that is formed with an outer threaded portion.

4. A fiber optic connector comprising:

a coupling device including a socket that defines a through groove extending in a front-rear direction (X), and a connecting seat that is connected to a rear end of said socket, and that has a casing portion defining a plugging space therein, a base wall portion disposed in said casing portion and defining a through hole which is in spatial communication with said through groove and said plugging space, two first connecting portions respectively disposed at two opposite lateral sides of said through hole and extending forwardly in the front-rear direction (X) from said base wall portion to said through groove, and two second connecting portions respectively disposed at the lateral sides of said through hole and extending rearwardly in the front-rear direction (X) from said base wall portion to said plugging space, said socket and said connecting seat being formed as one piece; and a cover removably mounted to said socket of said coupling device for covering a front end of said through groove of said socket.

5. The fiber optic connector as claimed in claim 4, wherein said coupling device further includes a guiding tube that is inserted into said through hole, and that has two opposite ends respectively extending into said through groove and said plugging space.

6. The fiber optic connector as claimed in claim 4, wherein said socket of said coupling device has an inner surrounding surface that defines said through groove and that is formed with an inner threaded portion at a front end thereof, and an outer surrounding surface that is opposite to said inner surrounding surface and that is formed with an outer threaded portion at a rear end thereof.

7. The fiber optic connector as claimed in claim 6, wherein said cover is permitted to be partly threaded to said inner threaded portion of said coupling device.

8. The fiber optic connector as claimed in claim 7, further comprising an annular ring threadedly mounted to said outer threaded portion of said coupling device.

9. The fiber optic connector as claimed in claim 7, further comprising a fiber optic connecting terminal removably connected to said second connecting portions of said coupling device, a housing threadedly mounted to said outer threaded portion of said coupling device, and a sleeving member connected to a rear end of said housing.

* * * * *

UNITED STATES PATENT AND TRADEMARK OFFICE
CERTIFICATE OF CORRECTION

PATENT NO. : 10,663,674 B1
APPLICATION NO. : 16/596314
DATED : May 26, 2020
INVENTOR(S) : Ling-Hua Zhu et al.

It is certified that error appears in the above-identified patent and that said Letters Patent is hereby corrected as shown below:

On the Title Page

Item (73) Assignee, please add --Gloriole Electroptic Technology Corp., Kaohsiung (TW)--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*